Dec. 6, 1949          A. W. STORM          2,490,167
ELECTRICAL BRIDGE MEASURING SYSTEM
Filed Oct. 11, 1945
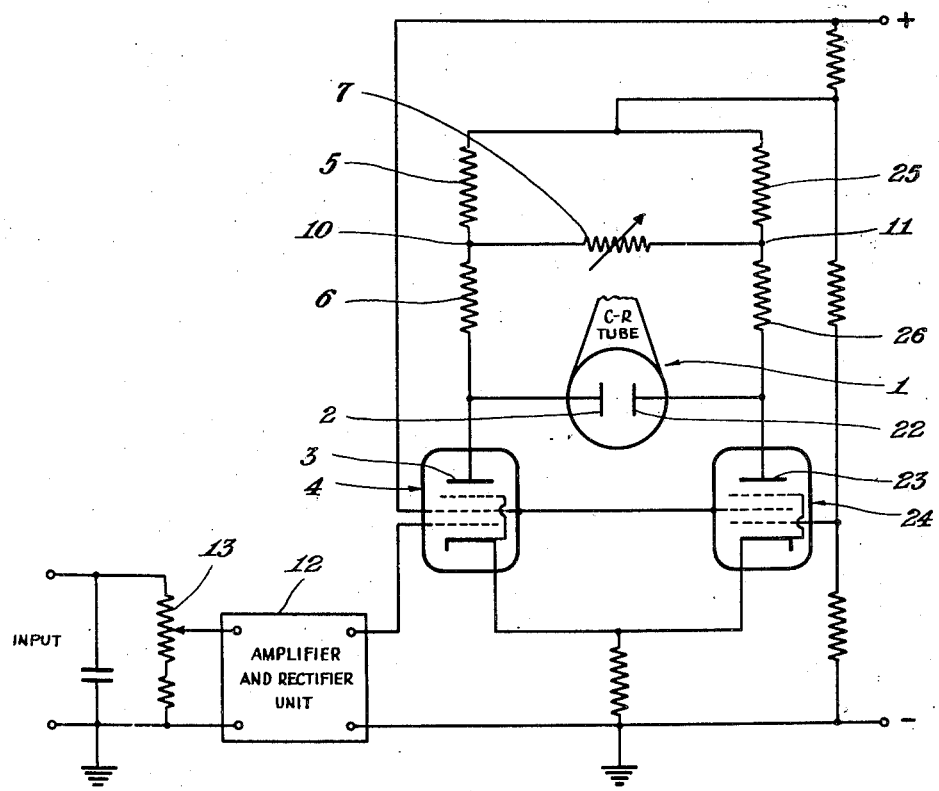
ANDRE WILLEM STORM
INVENTOR.
BY Lee B. Kenon
ATTORNEY.

Patented Dec. 6, 1949

2,490,167

UNITED STATES PATENT OFFICE 2,490,167

ELECTRICAL BRIDGE MEASURING SYSTEM

André Willem Storm, Sydney, New South Wales, Australia, assignor to Hartford National Bank & Trust Company, Hartford, Conn., as trustee Application October 11, 1945, Serial No. 621,688
In Australia June 8, 1944

5 Claims. (Cl. 171—95)

This invention relates to electrical bridges of the type in which an "out of balance" potential or voltage causes the deflection of an indicator to give a reading. The indicator is normally maintained at a reference point and the amount of deflection from the reference point is proportional to the value of the potential or voltage.

In instruments of this type, it is desirable to provide adjusting means whereby the initial position of the indicator may be arranged to coincide with the reference point. In addition it is also desirable to provide means for controlling the sensitivity of the instrument so that the movement of the indicator is of a convenient magnitude.

In bridges of known type, the initial position adjusting means and the sensitivity control means are liable to interact with each other to the detriment of the efficient operation of the instrument.

It is the primary object of the present invention to provide a bridge having means for adjusting the initial position of the indicator and means for controlling the sensitivity of the instrument in which the sensitivity control means may be regulated without any substantial interference with the initial adjustment of the indicator.

The invention will now be described with reference to the accompanying drawing which shows the circuit diagram of a bridge according to the invention.

The bridge shown in the diagram is of the vacuum tube type in which a cathode ray oscilloscope I is employed as the indicator and in which the co-operating deflection plates 2—22 of the oscilloscope are fed from the anodes 3—23 of the two thermionic vacuum tubes 4 and 24. The tubes 4 and 24 each form an arm of the bridge and the remaining arms of the bridge comprise suitable resistors later to be more fully referred to. When the bridge is balanced, the anodes 3 and 23 respectively are at the same potential and the "spot" of the oscilloscope is at the reference position. If the potential of either one of the anodes 3 or 23 is changed, as a result of the bridge becoming unbalanced, the "spot" will move in a direction which depends upon the polarity of the change in potential for a distance which is proportional to the value of the change in potential.

In a vacuum tube bridge of this type control of sensitivity may be obtained by making provision for variation in the anode load resistances of the two tubes 4—24 of the bridge but unless these anode resistances are varied simultaneously the "spot" of the oscillograph will be moved from the reference position and will require readjustment.

According to a preferred form of the present invention the effective anode load resistances of the two vacuum tubes 4—24 may comprise a network of, for example, five resistors, 5, 6, 7, 25 and 26, resistors 5 and 6 being connected in series with the anode of the tube 4 and resistors 25 and 26 being connected in series with the anode of the tube 24. Resistors 5 and 6 form another arm of the bridge and the resistors 25 and 26 form the remaining arm of the bridge. Resistor 7 is preferably made variable and is connected between the junction point 10 of resistors 5 and 6 and the junction point 11 of resistors 25 and 26. Resistor 5 is also preferably of the variable type so that the potentials of the junction points 10 and 11 may be equalized.

It will be apparent that, when the junction points 10 and 11 are at the same potential, no current will flow through the resistor 7 and therefore this resistor may be varied without changing the anode potentials of the two tubes 4 and 24 and thereby without moving the "spot" of the oscilloscope I. On the other hand it can be shown that variation of the resistor 7 will vary the effective anode load resistances of the two tubes 4 and 24. It therefore follows that the sensitivity of the bridge may be varied by adjusting resistor 7 without moving the spot of the oscillograph from the reference position.

In the circuit diagram shown in the drawing the input to the bridge is obtained from a suitable amplifier and rectifier unit which is shown in block form and indicated by the numeral 12. The input to the amplifier is adjusted to a suitable value by potentiometer 13.

For the operation of the bridge the "spot" of the oscilloscope is adjusted so that it is at the reference position by means of the potentiometer 13 which controls the input to the unit 12 and thus regulates the potential applied to the bridge.

Resistor 5 and the resistor 7 are then adjusted until an adjustment of resistor 5 is reached where variation of resistor 7 produces no variation in the position of the oscilloscope "spot." This will occur when there is no potential difference between the junction points 10 and 11. Obviously, therefore, the sensitivity of the bridge may be controlled by means of resistor 7 without moving the "spot," after the initial adjustments have been made.

When the bridge has been adjusted for operation a voltage excursion at the input to the unit 12 will cause the bridge to become unbalanced and the "spot" of the oscilloscope will move from the reference point a distance which will represent the value of the excursion in the voltage.

The network of resistors which form the anode load resistances of the two tubes of a vacuum tube bridge as above described may be utilised in numerous ways to provide sensitivity and reference position adjustments which are substantially free from interaction with each other.

For example it may be desirable for the reference position of the indicator or "spot" to be at a position at which equality between the potentials of the anodes of the tubes is not required. In other words the desired reference position may be one for which the bridge is not balanced. The arrangement of the network of resistors can be readily changed to take care of such a situation by adopting suitable resistance values for the network in conjunction with suitable adjustments to the plate currents of the tubes.

It will be appreciated from the foregoing that irrespective of the value of the resistors used and the value of the plate currents of the tubes, if no difference of potential exists between the junction point 10 and the junction point 11 when the indicator is in the reference position, any adjustment of the sensitivity of the bridge by means of the resistor 7 will not cause any substantial change in the initial adjustment of the indicator.

Having now described my invention what I claim as new and desire to secure by Letters Patent is:

1. A bridge circuit measuring arrangement comprising, a first branch circuit having a first impedance element, a second impedance element and a third impedance element connected in series with each other, a second branch circuit having a fourth impedance element, a fifth impedance element and a sixth impedance element connected in series with each other, said second branch circuit being connected in parallel with said first branch circuit whereby one terminal of said first element is connected to one terminal of said fourth element, means to connect a source of operating potential across said branch circuits, an indicator element connected between the junction point of said first and said second impedance elements and the junction point between said fourth and said fifth impedance elements, a seventh impedance element connected between the junction point of said second and third impedance elements and said fifth and sixth impedance elements, means to vary the impedance of one of the impedance elements in said first and second branch circuits to adjust the potential across said seventh element to substantially zero value, means to vary the impedance of said seventh element to adjust the sensitivity of the bridge, and means to vary the impedance of another of the impedance elements in said first and second branch circuits in accordance with a factor to be measured.

2. A bridge circuit measuring arrangement comprising, a first branch circuit having a first impedance element, a second impedance element and a third impedance element connected in series with each other, a second branch circuit having a fourth impedance element, a fifth impedance element and a sixth impedance element connected in series with each other, said second branch circuit being connected in parallel with said first branch circuit whereby one terminal of said first element is connected to one terminal of said fourth element, means to connect a source of operating potential across said branch circuits, an indicator element connected between the junction point of said first and said second impedance elements and the junction point between said fourth and said fifth impedance elements, a seventh impedance element connected between the junction point of said second and third impedance elements and said fifth and sixth impedance elements, means to vary the impedance of said sixth impedance element to adjust the potential across said seventh impedance element to a value substantially zero, means to vary the impedance of said seventh impedance element to adjust the sensitivity of the bridge, and means to vary the impedance of the fourth impedance element in accordance with a factor to be measured.

3. An electric circuit arrangement comprising, a first branch circuit having a first impedance element, a second impedance element and a third impedance element connected in series with each other, a second branch circuit having a fourth impedance element, a fifth impedance element and a sixth impedance element connected in series with each other, means to connect a source of operating potential across said branch circuits, said second branch circuit being connected in parallel with said first branch circuit whereby one terminal of said first element is connected to one terminal of said fourth element, an indicator element connected between the junction point of said first and said second impedance elements and the junction point between said fourth and said fifth impedance elements, means to adjust the initial impedance of said fourth element, to establish a given off-center reference point for said indicator element, means to vary the sensitivity of said indicator element comprising a seventh and adjustable impedance element connected between the junction point of said second and third impedance elements and said fifth and sixth impedance elements, means to vary the impedance of said sixth impedance element to adjust the potential across said seventh impedance element to a value substantially zero to thereby permit adjustment of said seventh impedance element independent of the indication of said indicator, and means to vary the impedance of the fourth impedance element in accordance with a factor to be measured.

4. A bridge circuit measuring arrangement comprising, a first branch circuit having an electron discharge tube, a first and a second resistor connected in series with each other, a second branch circuit having a second electron discharge tube, a third resistor and a fourth and adjustable resistor connected in series with each other, said second branch circuit being connected in parallel with said first branch circuit whereby said tubes have a terminal in common and said second and fourth resistors have a terminal in common, means to connect a source of operating potential across said branch circuits, an indicator element connected between the junction point of said first electron discharge tube and said first resistor and the junction point between said second electron discharge tube and said third resistor, a fifth and adjustable resistor connected between the junction point of said first and second resistors to adjust the sensitivity of the bridge and said third and fourth resistors, and means to vary the resistance of one of said electron discharge tubes in accordance with a factor to be measured.

5. A bridge circuit arrangement comprising, a first branch circuit having a grid-controlled electron discharge tube, a first and a second resistor connected in series with each other, a second branch circuit having a second grid-controlled electron discharge tube, a third resistor and a fourth and adjustable resistor connected in series with each other, said second branch circuit being connected in parallel with said first branch circuit whereby said tubes have a terminal in common and said second and fourth resistors have a terminal in common, means to connect a source of operating potential across said branch circuits, an indicator element connected between the junction point of said first electron discharge tube and said first resistor and the junction point between said second electron discharge tube and said third resistor, an input voltage divider having an adjustable tap, an amplifier whose input is coupled between said tap and one end of said voltage divider, a rectifier coupled between the output of said amplifier and the grid of said second electron discharge tube, and means to apply a voltage to be measured across said divider.

ANDRÉ WILLEM STORM.

REFERENCES CITED

The following references are of record in the file of this patent:

UNITED STATES PATENTS

| Number | Name | Date |
| --- | --- | --- |
| 1,665,397 | Wunsch | Apr. 10, 1928 |
| 1,847,127 | Mayer | Mar. 1, 1932 |
| 2,208,254 | Geohegan | July 16, 1940 |
| 2,237,950 | Pineo | Apr. 8, 1941 |
| 2,252,301 | Moore | Aug. 12, 1941 |
| 2,255,771 | Golay | Sept. 16, 1941 |
| 2,264,197 | Hadfield | Nov. 25, 1941 |
| 2,290,559 | Hitchcock | July 21, 1942 |
| 2,300,198 | Brown | Oct. 27, 1942 |
| 2,418,284 | Winchell | Apr. 1, 1947 |